G. F. CLEMONS.
Machine for Preparing Tow from Tangled Flax Straw.
No. 39,119.
Patented July 7, 1863.
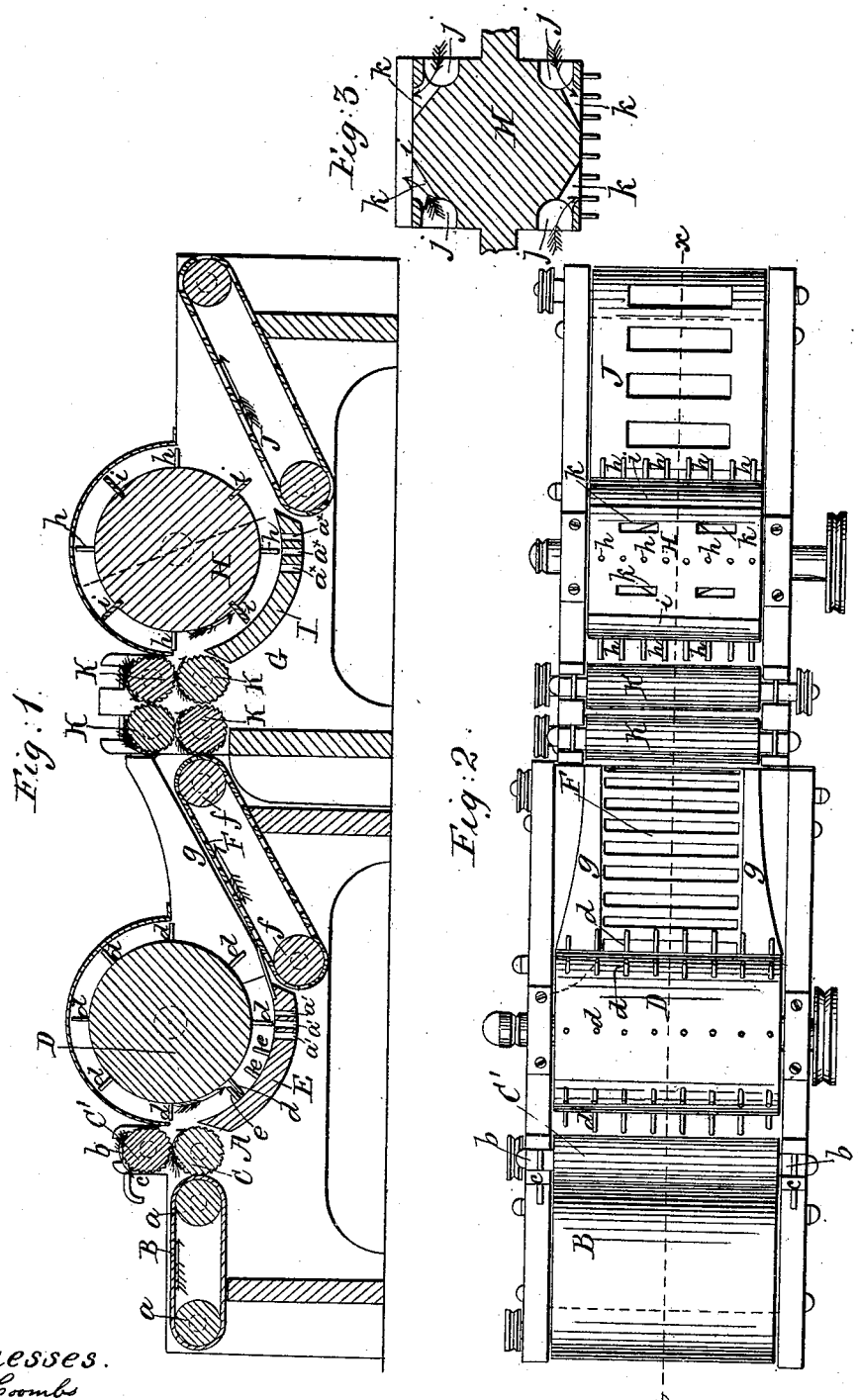

United States Patent Office.

GEORGE F. CLEMONS, OF SPRINGFIELD, MASSACHUSETTS.

IMPROVEMENT IN MACHINES FOR PREPARING TOW FROM TANGLED FLAX-STRAW.

Specification forming part of Letters Patent No. 39,119, dated July 7, 1863.

*To all whom it may concern:*

Be it known that I, GEORGE F. CLEMONS, of Springfield, in the county of Hampden and State of Massachusetts, have invented a new and Improved Machine for Making or Preparing Tow from Tangled Flax-Straw; and I do hereby declare that the following is a full, clear, and exact description of the same, reference being had to the accompanying drawings, making a part of this specification, in which—

Figure 1 is a side sectional view of my invention, taken in the line $xx$, Fig. 2; Fig. 2, a plan or top view of the same; Fig. 3, a section of a part pertaining to the same, taken in the line $x'x'$, Fig. 1.

Similar letters of reference indicate corresponding parts in the several figures.

The invention consists in a combination and arrangement of breaking-rollers, toothed cylinders, and concaves and discharging and feed aprons, one of the toothed cylinders being so constructed as to serve as a fan or blower, and all arranged as hereinafter shown and described, whereby the desired work—to wit, the preparing of tow from tangled flax—may be accomplished in a rapid and thorough manner.

To enable those skilled in the art to fully understand and construct my invention, I will proceed to describe it.

A represents a rectangular box or framing, on the upper part of which there is an endless apron, B, said apron having a horizontal position and working over rollers $a\,a$. (See Fig. 1.) Directly in front of the apron B there are placed two fluted or corrugated rollers, C C', one roller being placed directly over the other, and both being in the same axial plane. The lower roller, C, works in fixed bearings, but the upper roller, C', has its journals fitted in vertical slots $b$ in uprights $c\,c$, attached to the framing—one at each side—so that said roller may yield or give. This arrangement, however, is common to all rollers used for this and analogous purposes. The bite of the rollers C C' is about on a level or in the same plane with the upper part of the apron B.

D is a cylinder, which is fitted transversely in the upper part of the framing A, in front of the rollers C C'. This cylinder has teeth $d$ fitted in its periphery in rows parallel with its shaft or axis. The teeth $d$ may be of cylindrical form. Directly below this cylinder there is a concave, E, which is also provided with teeth $e$, placed in rows parallel with the shaft or axis of the cylinder D. The teeth $e$ of the concave have a radial position with the teeth $d$ of the cylinder D, and the former are placed out of line with the latter, so that the teeth of the cylinder may pass the teeth of the concave as said cylinder rotates. The concave is also provided with three (more or less) openings or slots, $a'$, which extend its whole width. These slots are shown in Fig. 1.

F represents an inclined discharging-apron, which is of open form—that is to say, formed either of slats or bars attached at their ends to tapes, or formed of leather or other suitable material, slotted transversely to admit of dust or fine foreign substances passing through it. (See Fig. 2.) The lower end of this discharging-apron is near the front end of the concave, so that the flax may readily pass on it from the concave. The endless apron works over suitable rollers, $f\,f$.

In the framing A, and directly over the apron F, there are placed two strips, $g\,g$, one at each side of the framing A. These strips $g\,g$ are beveled at their upper surfaces, and inclined, so as to afford a free passage for the flax on the apron. These strips $g\,g$ render the apron F considerably narrower than the cylinder D, as will be seen by referring to Fig. 2.

G represents a box or framing, which is constructed like the box A, and is provided with a cylinder, H, concave, provided with slots $a^\times$, and an endless discharge-apron, J, and fluted or corrugated rollers K. The framing G, however, is narrower than the framing A, the internal width of the former corresponding to the width of the exposed surface of the endless apron F in framing A, and all the working parts in framing G are consequently proportionably shorter or of less width than those in A. There are in G two pairs of fluted rollers K, and the two framings A G are placed together in contact, so that the flax will be conveyed from the endless apron F to the rollers K.

The cylinder H is provided with teeth $h$, similar to the teeth of the cylinder D. The concave I, however, has no teeth. In addition to the teeth $h$, the cylinder H is provided at its periphery with radial plates or wings $i$, which extend its whole width, and are placed on the cylinder alternately with the rows of teeth $h$.

The cylinder H is made concave at each end, as shown at $j$ in Fig. 3, and the periphery of said cylinder has holes $k$ made in it, which communicate with the concaves at the end of the cylinder.

The operation is as follows: The tangled flax is placed upon the endless apron B, which feeds it to the rollers C C', which serve as breaking-rollers and rotate in the direction indicated by the arrows 1. The flax passes between these rollers and down between the cylinder D and concave E, the teeth of the cylinder and concave heckling the flax and straightening it, while the dust and a great portion of the woody foreign substances contained in the flax pass out through the slots $a'$ in the concave. The flax being thus operated upon is considerably reduced in bulk, and assumes the form of tow, its fiber being arranged or disposed nearly parallel, in which state it is discharged upon the open endless apron F, which allows the dust and fine foreign substances to pass through it, and, in consequence of being reduced in width by the side strips, $g\,g$, is of the proper area to correspond to the diminished bulk of the flax, and carry the same in a proper manner, with its fibers parallel, or nearly so, to the breaking-rollers K of the framing G, between which it passes, and then down between the cylinder H and concave I, and is still further heckled and fully converted into tow, and then passes upon the endless apron J, which discharges it from the framing G. While upon apron J it is subjected to a blast of air generated by the plates or wings $i$ as the cylinder H rotates, the air passing into the concave ends of cylinder H through the holes $k$, and being expelled from its periphery toward the apron J. The red arrows in Fig. 3 show the direction of the blast.

I do not claim separately any of the parts herein shown and described, irrespective of their arrangement and combination, as set forth; but I do claim as new and desire to secure by Letters Patent—

1. The breaking-rollers K, cylinder H, constructed with concave ends $j$, and having holes $k$ made in it, as shown, and provided with teeth $h$ and wings $i$, and the open endless apron J, when all are combined and arranged to operate as and for the purpose herein set forth.

2. The side pieces or strips, $g\,g$, placed over the endless apron F, for the purpose of reducing the width of the same when said side strips or pieces are used, in connection or combination with the cylinders D H, concaves E I, breaking-rollers C C' K, and endless apron J, for the purpose herein set forth.

GEORGE F. CLEMONS.

Witnesses:
WM. BALL,
CHARLES E. NOYES.